(12) United States Patent
Hopson

(10) Patent No.: US 6,382,251 B1
(45) Date of Patent: May 7, 2002

(54) COUPLING WITH MALE HALF HAVING INTERNAL PRESSURE RELIEF

(75) Inventor: Douglas F. Hopson, Union City, PA (US)

(73) Assignee: Snap-Tite Technologies, Inc., Wilmington, DE (US)

( * ) Notice: Subject to any disclaimer, the term of this patent is extended or adjusted under 35 U.S.C. 154(b) by 0 days.

(21) Appl. No.: 09/538,062

(22) Filed: Mar. 29, 2000

(51) Int. Cl.$^7$ ................................................ F16L 37/28
(52) U.S. Cl. ............. 137/614.05; 137/614; 137/614.01; 137/614.04; 251/282
(58) Field of Search .................. 137/614.04, 614.05, 137/614, 614.01; 251/281, 282

(56) References Cited

U.S. PATENT DOCUMENTS

| | | | | |
|---|---|---|---|---|
| 3,498,324 A | * | 3/1970 | Breuning | |
| 3,570,543 A | * | 3/1971 | Ekman | 137/614.04 |
| 4,702,278 A | * | 10/1987 | Badoureaux | 137/614.05 |
| 4,854,345 A | * | 8/1989 | Badoureaux | 137/614.05 |
| 5,063,965 A | * | 11/1991 | Wilcox | 137/614.03 |
| 5,159,955 A | * | 11/1992 | Ekman | 137/614 |
| 5,592,970 A | * | 1/1997 | Stucchi et al. | 137/614.03 |
| 5,881,769 A | * | 3/1999 | Hopson | 137/614.2 |
| 6,026,857 A | * | 2/2000 | Stucchi | 137/614.03 |
| 6,095,190 A | * | 8/2000 | Wilcox et al. | 137/614.04 |

FOREIGN PATENT DOCUMENTS

WO    WO 98/19097    *    7/1998

* cited by examiner

*Primary Examiner*—A. Michael Chambers
(74) *Attorney, Agent, or Firm*—Woodling, Krost and Rust

(57) ABSTRACT

A coupling half comprising: a body; a principal valve seating against the body and unseating therefrom; a relief valve seating against the principal valve and unseating therefrom; and, a flush face sliding sleeve valve seating against the body and unseating therefrom is disclosed. When the flush face sliding sleeve valve unseats from the body it travels toward the relief valve and engages the relief valve unseating the relief valve from the principal valve permitting flow by the relief valve and enabling the principal valve to unseat from the body. The relief valve and the principal valve define an annulus therebetween. The principal valve includes a passageway for relieving pressure by the relief valve. As the relief valve unseats from the principal valve, flow is permitted to the annulus defined by the relief valve and the principal valve and through the passageway in the principal valve and to a reservoir generally defined by the principal valve and the body. This causes a reduction in pressure upstream of the principal valve which enables the principal valve to unseat from the body. A first balanced seal resides in a circumferential groove in the body of the coupling half and prevents the escape of fluid from the coupling half and a second balanced seal resides in a first circumferential groove of the principal valve and prevents intrusion of fluid into a volume generally bounded by the interior of the flush face sliding sleeve valve, and the exteriors of the relief valve and principal valve. The principal valve and the relief valve both include extensions which are threaded thereto.

15 Claims, 6 Drawing Sheets

US 6,382,251 B1

COUPLING WITH MALE HALF HAVING INTERNAL PRESSURE RELIEF

FIELD OF THE INVENTION

The invention is a coupling which may be connected with pressure on the male half. Typically, the invention is used on agricultural implements such as tractors or small versions thereof. The male half of the coupling includes a relief valve which is operated during connection with the female thus enabling easier connection with a pressurized male half.

BACKGROUND OF THE INVENTION

International Publication WO 98/19097 published May 7, 1998 and filed Oct. 17, 1997 by applicant STUCCHI S.R.L. discloses a male half of the coupling in FIG. 1 thereof which includes a seal 40 carried in a fixed body 32, a piston 37, a safety valve 37 abutting an inner element 34, and, a relief valve 46 being a ball valve 46 actuated by pin 45 for venting to chamber 48. U.S. Pat. No. 6,026,857 issued Feb. 22, 2000 to Stucchi claims priority based on International Publication WO 98/19097. U.S. Pat. No 5,592,970 to Stucchi et al. issued Jan. 14, 1997 discloses structure similar to WO 98/19097 except the relief valve and pin are missing. The '970 patent is directed to preventing the blowout of seal 40 by covering it with bush 10.

The structure disclosed in WO 98/19097 will leak by the ball valve 46 and the interface between valve 73 and inner body member 34 at low pressures, for example, below 500 psig. Leaking around valve 46 and the interface negates the purpose of the relief valve 46 as the volume available will be filled. Leakage may occur at pressures greater than 500 psig but the increased pressures tend to enhance the metal to metal seals employed by STUCCHI S.R.L. in WO 98/19097.

U.S. Pat. No. 3,498,324 to Breuning discloses secondary valves which first engage each other and open causing a flow through the secondary flow passages from the high pressure side to the low pressure side of the coupling. The valves are in the male and the female halves of the coupling. U.S. Pat. No. 3,570,543 to Ekman discloses a coupling halving pressure relief valves in both the male and female halves.

U.S. Pat. No. 5,159,955 to Ekman, in FIGS. 4a–4d, discloses an actuation member formed by 21a' and a bearing member/housing 35 and a valve member 36. The actuation member upon coupling urges the ball 19' off its seat and permits upstream pressure to be vented into chamber 26' as indicated by flow arrow 71.

U.S. patent application Ser. No. 09/193,346 filed Nov. 17, 1998 now U.S. Pat. No. 6,095,190 issued Aug. 1, 2000. That application disclosed a coupling with a female half having internal pressure relief. The pressure relief is accomplished in part by a ball valve which engages an interior seat of the main valve. A flat edged push pin is employed to operate the ball valve and the main valve includes at least one relief port which communicates with a passageway formed by a bore in the main valve and the push pin.

The related art also includes a design by Parker Hannifin Corporation. The design includes a main valve which floats leftwardly and rightwardly into and out of engagement with an adaptor. The seal formed between the main valve and the adaptor is a metal to metal seal. Further, a metal to metal seal is formed between the relief valve and the main valve. These metal to metal seals can and do leak which cause the application of high pressure in the adaptor to the relief valve and its threaded extension. The threaded extension of the Parker Hannifin design provides a large surface area upon which fluid under pressure may act which leaks by either the main valve or the relief valve. This causes the stripping of the relief valve as it is literally pushed and pulled through the main valve or the relief valve extension breaks loose of the relief valve or the relief valve and its extension fracture due to the large tensile forces created by the large pressure.

None of the related art, however, provides for a balanced male coupling half having a stable and reliable internal pressure relief valve. The instant invention provides a strong pressure relief valve and a large capacity reservoir for the relief of high pressure. Further, due to the balanced nature of the male half of the coupling in combination with a dry space or volume between the flush face sliding sleeve, the pressure relief valve, and the principal valve, pressure relief in the conduits connected upstream of the male half of the coupling is easily achieved.

SUMMARY OF THE INVENTION

A coupling half comprising: a body; a principal valve seating against the body/adaptor and unseating therefrom; a relief valve seating against the principal valve and unseating therefrom; and, a flush face sliding sleeve valve seating against the body and unseating therefrom is disclosed. When the flush face sliding sleeve valve unseats from the body it travels toward the relief valve and engages the relief valve unseating the relief valve from the principal valve permitting flow by the relief valve and enabling the principal valve to unseat from the body. The principal valve is closed until the male and the female halves of the coupling have been sufficiently connected.

The relief valve and the principal valve define an annulus therebetween. The area of the relief valve exposed to pressure is small so as to minimize the forces applied to the relief valve which tend to pull the relief valve through the principal valve. When disconnected, pressurized fluid from the adaptor may leak by a metal to metal seal formed between the relief valve and the principal valve. Further, pressurized fluid may leak by the seal between the principal valve and the adaptor. The relief valve is substantially cylindrical with its maximum diameter being 1.7 times its minimum diameter.

The principal valve includes a passageway for relieving pressure upstream of the principal valve. As the relief valve unseats from the principal valve, flow is permitted to the annulus defined by the relief valve and the principal valve and through the passageway in the principal valve and to a reservoir generally defined by the principal valve and the body. This causes a reduction in pressure upstream of the principal valve which enables the principal valve to unseat from the body. Usually an adaptor is affixed to the body such that the principal valve seats against the adaptor.

A first balanced seal resides in a circumferential groove in the body of the coupling half and prevents the escape of fluid from the coupling half and a second balanced seal resides in a first circumferential groove of the principal valve and prevents intrusion of fluid into a volume generally bounded by the interior of the flush face sliding sleeve valve, and the exteriors of the relief valve and principal valve. The principal valve and the relief valve both include extensions which are threaded thereto. The principal valve and relief valve as used herein refer to the principal valve and the relief valve together with their respective extensions.

An annulus, or reservoir, is formed between said principal valve and the body. A yoke and a first spring are disclosed and the first spring is operable between the body and the yoke urging the yoke into engagement with the flush face sliding sleeve valve. A seal resides in a second circumferential groove of the principal valve and prevents intrusion of fluid into a volume generally bounded by the interior of the flush face sliding sleeve valve, and the exteriors of the relief valve and principal valve.

A second spring is operable between a shoulder on the relief valve and the principal valve. Extensions of the principal and relief valves are threaded to the principal and the relief valve, respectively.

Accordingly, it is an object of the present invention to provide a male coupling half with internal pressure relief past the principal valve so as to provide easy connection under pressure with upstream pressure applied to the principal valve and the male coupling half.

It is a further object of the present invention to provide a male coupling half which has pressure balanced valving to enable easy connection with pressure on the male coupling half.

It is a further object of the present invention to provide a male coupling half having a volume generally bounded by the interior of the flush face sliding sleeve valve, and the exteriors of the relief valve and principal valve which does not have fluid therein. Put another way, it is an object to maintain the volume dry.

It is an object of the instant invention to provide a coupling half which may be used in one quarter inch couplings. These small couplings necessitate small relief valves which do not fracture employing the teachings of the instant invention.

These and other objects of the invention will be better understood when taken in conjunction with the Brief Description of the Drawings, the Description of the Invention, the Drawings and the Claims which follow hereinbelow.

The drawings will be better understood when referring to the Description Of the Invention which follows hereinbelow.

DESCRIPTION OF THE INVENTION

Figure 1:
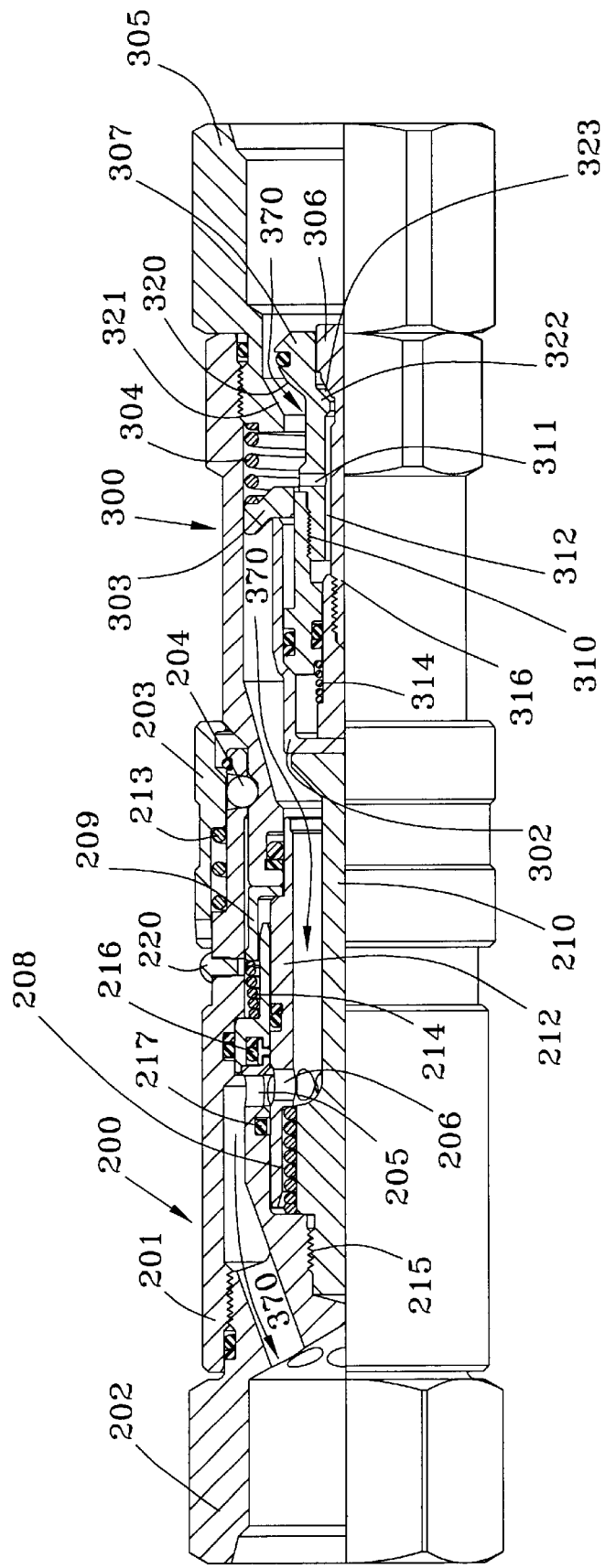
FIG. 1 is a quarter-sectional view of a coupling illustrating the male and female halves coupled together.

FIG. 1 is a quarter-sectional view of a coupling illustrating the male 300 and female 200 halves coupled together. Flow represented by flow arrow 370 is illustrated in FIG. 1. Referring to FIG. 1, flow of fluid, typically hydraulic fluid used in agricultural implements, proceeds in a direction leftwardly along the path generally defined by flow arrow 370. Those skilled in the art will recognize that flow may be in either direction once the coupling is fully connected. Flow proceeds past the principal flow valve 307 of the male half 300 of the coupling and continues leftwardly past spring 304, yoke 303, pintle 210 and sliding sleeve 212 of the female, through port 206 in sliding sleeve 212 of the female and into and through port 205 in the adaptor 202 of the female and out leftwardly where it does some work in powering an agricultural implement.

Figure 2:
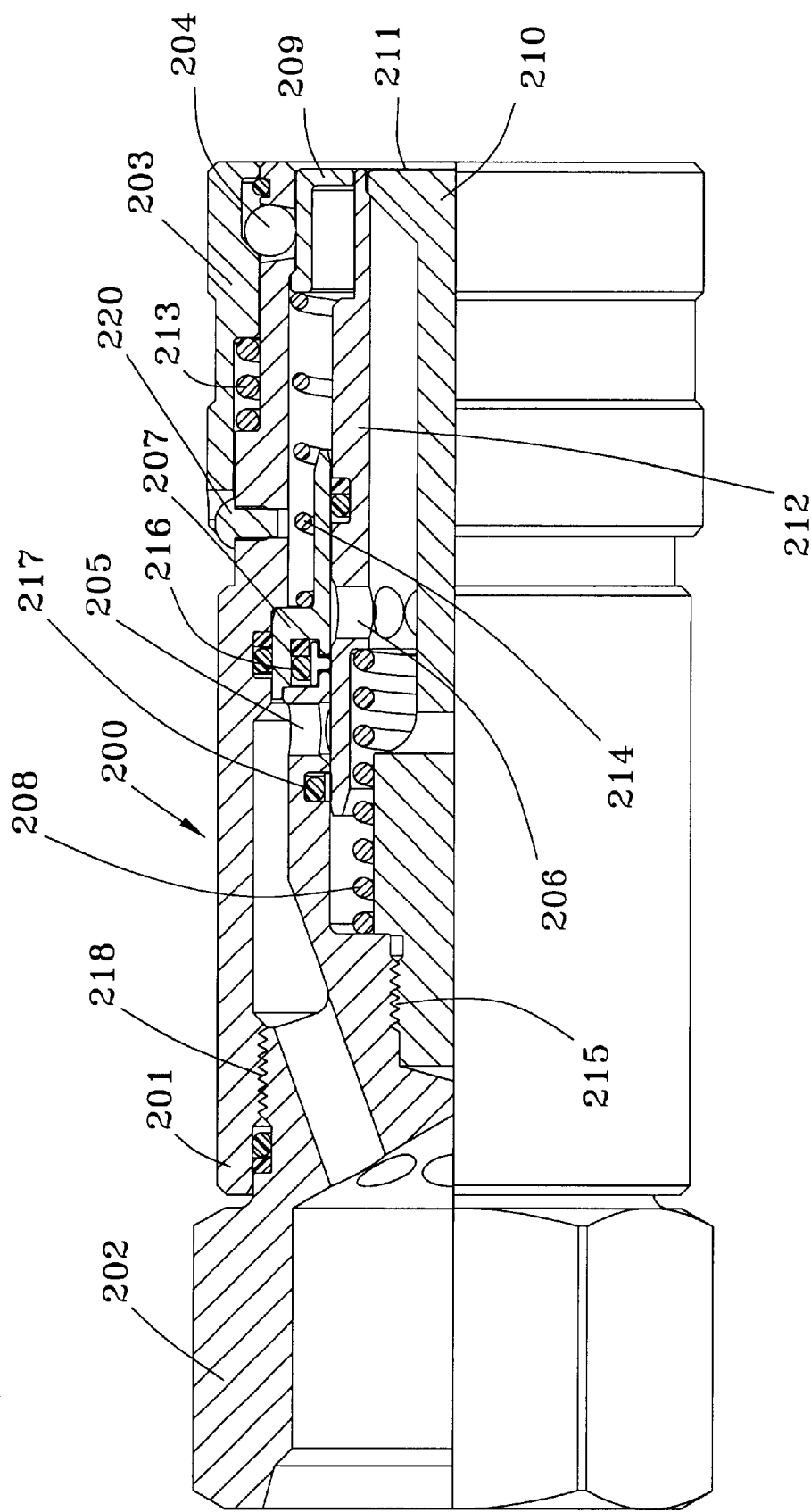
FIG. 2 is a quarter-sectional view of the female half of the coupling of FIG. 1 illustrated in its disconnected state.

FIG. 2 is a quarter-sectional view of the female half 200 of the coupling of FIG. 1 illustrated in its disconnected state. The female half of the coupling further includes a body 201, a locking sleeve 203, locking balls or detents 204 which hold the coupling 20 together, and a retainer 207. Spring 208 is operable between the adaptor 202 and the sliding sleeve 212. Flush face sleeve 209 and the face 211 of the pintle engage the body 301 and the flush face sliding sleeve 302 of the male half of the coupling 300, respectively. Referring to FIG. 2, spring 213 is operable between the body 201 and the locking sleeve 203 and spring 214 is operable between the retainer 207 and the flush face sleeve 209. Threaded interconnection 215 secures the pintle 210 and adaptor 202 together and threaded interconnection 218 secures the adaptor 202 and the body 201 together. Reference numerals 216 and 217 represent seals for ports 205 and 206 when the coupling is coupled.

Figure 3:
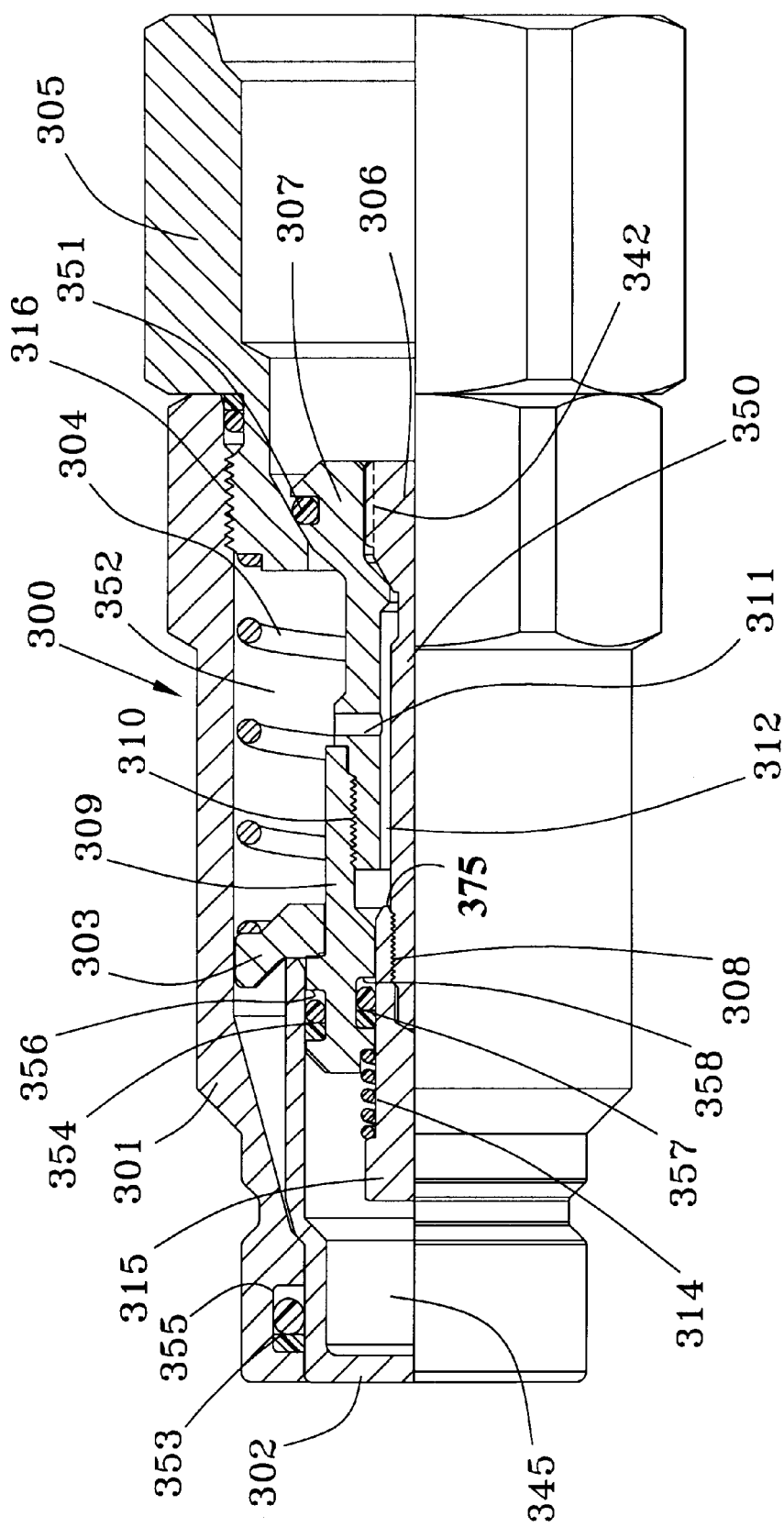
FIG. 3 is a quarter-sectional view of the male half of the coupling of FIG. 1 illustrated in its disconnected state.

FIG. 3 is a quarter-sectional view of the male half of the coupling of FIG. 1 illustrated in its disconnected state. Adaptor 305 is threaded 316 to body 301. Principal valve 307 includes a seal 351 for sealing a source of pressure connected to the adaptor 305. Principal flow valve 307 includes an extension 309 which is threaded 310 thereto. A passageway 311 in principal valve 307 for the relief of pressure communicates with annulus 312 formed between the principal valve 307 and the relief valve 350. Relief valve 350 includes an extension 315 threaded 308 thereto. The relief valve 350 and its extension 315 are substantially cylindrical with their maximum diameter being 1.7 times their minimum diameter.

Figure 4:
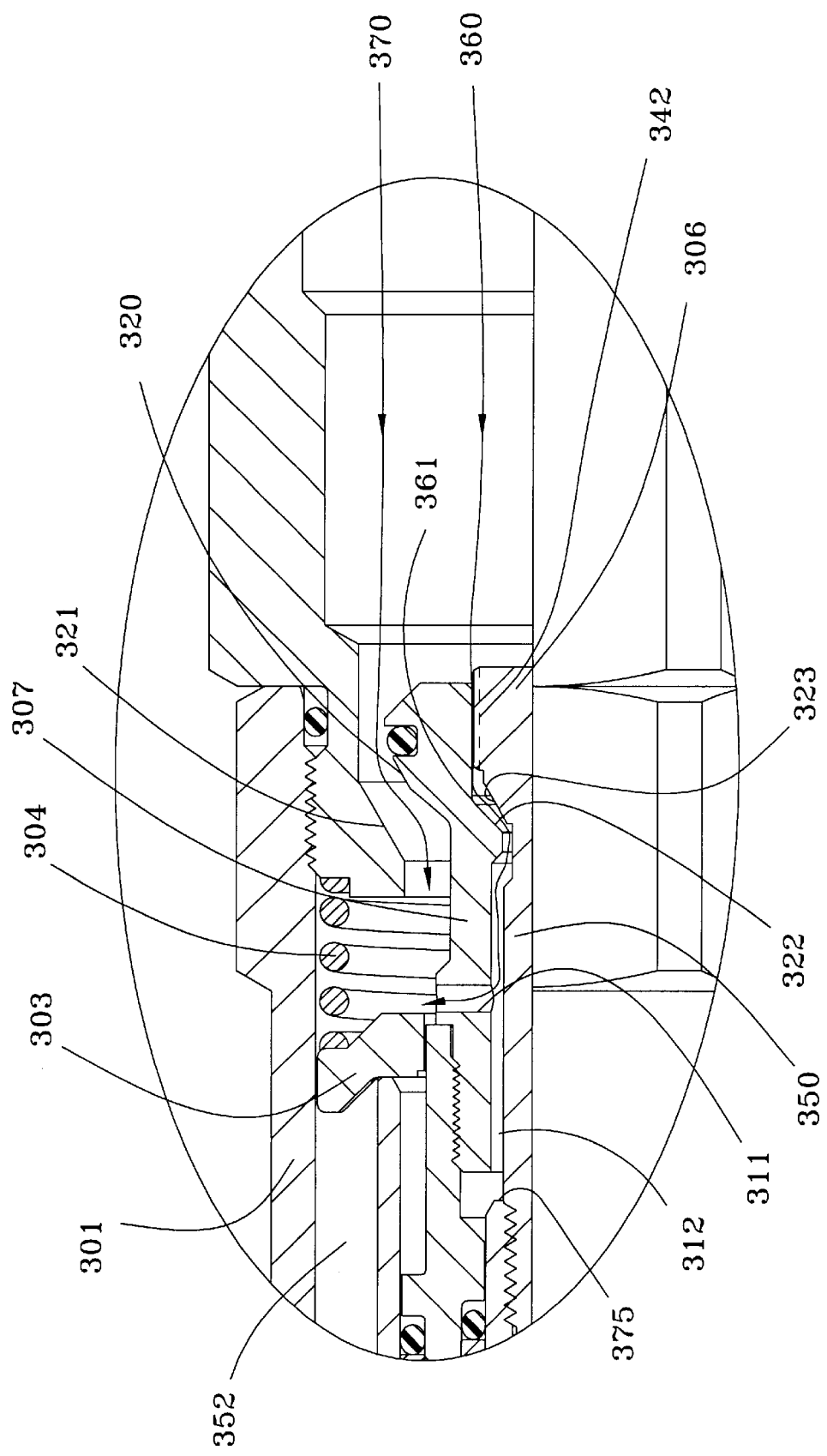
FIG. 4 is an enlarged portion of the male half of the coupling as it is shown in FIG. 1.
Figure 5:
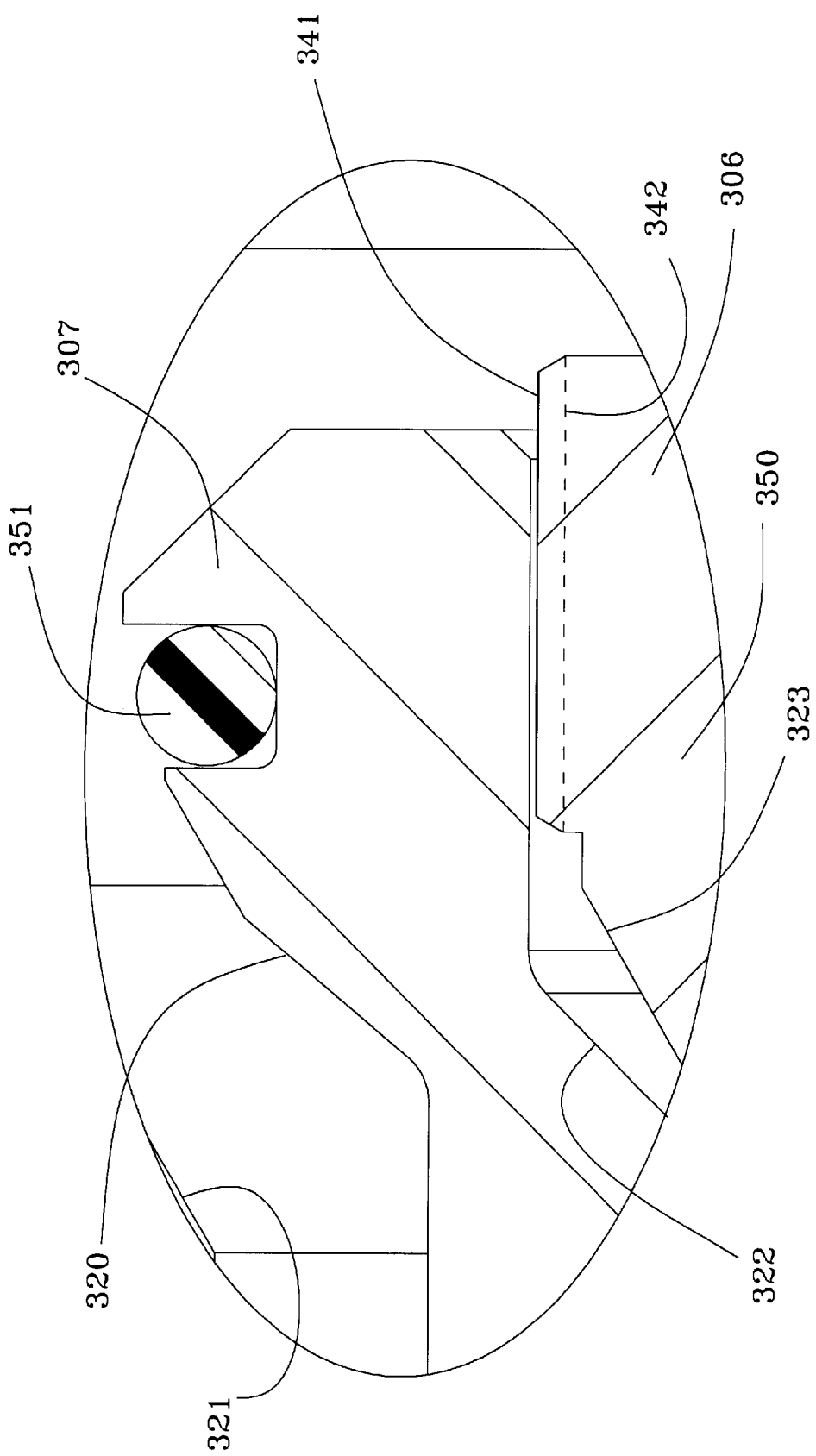
FIG. 5 is an enlarged portion of FIG. 4 illustrating guidance of the relief valve having a hexagonal end portion which resides in a bore of the principal valve.

Relief valve 350 includes a hexagonal end 306 best viewed in FIGS. 4 and 5. FIG. 4 is an enlarged portion of the male half 300 of the coupling as it is shown in FIG. 1. FIG. 5 is an enlarged portion of FIG. 4 illustrating the hexagonal end portion of the relief valve. Surfaces 341 of the hexagonal end portion 306 of the relief valve 350 each have a point engagement with a bore in the principal valve. Flow of fluid past the hexagonal end portion 306 occurs when the seating surface 323 of the relief valve 350 moves away from seat 322 on the principal valve 307.

Referring to FIGS. 4 and 5, reference numeral 342 refers to a dashed line which indicates one of the other hexagonal flats of the hexagonal end portion 306 of the relief valve 350. Referring to FIGS. 3 and 4, fluid reservoir or annulus 352 is formed by the principal valve 307 and the body 301. When the female half and the male half of the couplings are joined as illustrated in FIGS. 1, 4 and 5, the flush face sliding sleeve 302 travels toward the relief valve extension 315 and urges it rightwardly causing the separation of the surface 323 of relief valve 350 to separate from the valve seat 322 on principal valve 307 against the resistance of spring 304. Flow of fluid proceeds past the flat edge portions of the hexagonal flats of the hexagonal end portion 306. Spring 314 operates between the extension 309 of the principal valve and the extension 315 of the relief valve.

Referring to FIG. 4, flow between the hexagonal end 306 of the relief valve 350 and bore 361 in principal valve 307 is indicated by flow arrow 360. Flow arrow 360 illustrates flow past the principal valve 307 into annulus 312, through passageway 311 in the principal valve and into reservoir 352. Reservoir 352 is interconnected with the volume generally defined by pintle 210 and sliding sleeve 212 as the coupling progresses. Flow as illustrated by flow arrow 360 in FIG. 4 occurs prior to the separation of valve seat surface 320 from valve seat 321 on the adaptor. Those skilled in the art will recognize that a single body may be used instead of a body and an adaptor in the male half and that the valve seat 321 could, therefore, be located on the body. For all practical purposes, the valve seat is on the body as herein illustrated if the body 301 and the adaptor 305 are taken as one piece.

Referring to FIG. 3, two balanced seals are shown. First balanced seal 353 resides in a circumferential groove 355 in body 301. Second balanced seal 354 resides in a circumferential groove 356 in the principal valve extension 309. It will be understood by those skilled in the art that the relief valve 350 and its extension 315 could be made from one piece as could the principal valve 307 and its extension 309.

Still referring to FIG. 3, relief valve 350 and its extension 315 act as a guide for the principal valve 307 and its extension 309. The principal valve 307/309 is concentric withe the relief valve 350/315 and is slidable relative thereto. See, FIG. 1 illustrating flush face sliding sleeve valve 302 urging the principal valve and the relief valve rightwardly.

If fluid exists in reservoir 352 following disconnection of the coupling as illustrated in FIG. 3, pressure may have a tendency to increase if the coupling is left exposed to the radiant energy of the sun. Frequently, this is the case as the couplings including the male half thereof are used on agricultural implements. Seals 353 and 354 are pressurized equally and no net force is applied to flush face sliding sleeve 302 which inhibits its movement. This enables movement of the flush face sliding sleeve 302 against the force of spring 304. Spring 304 acts between the adaptor 305 and the yoke 303. Flush face sliding sleeve 302 in turn engages yoke 303. In the disconnected condition, yoke 303 urges sleeve 302 into valving engagement with body 301. Yoke 303 contains several passageways therethrough which enable flow through the coupling as previously described.

Figure 6:
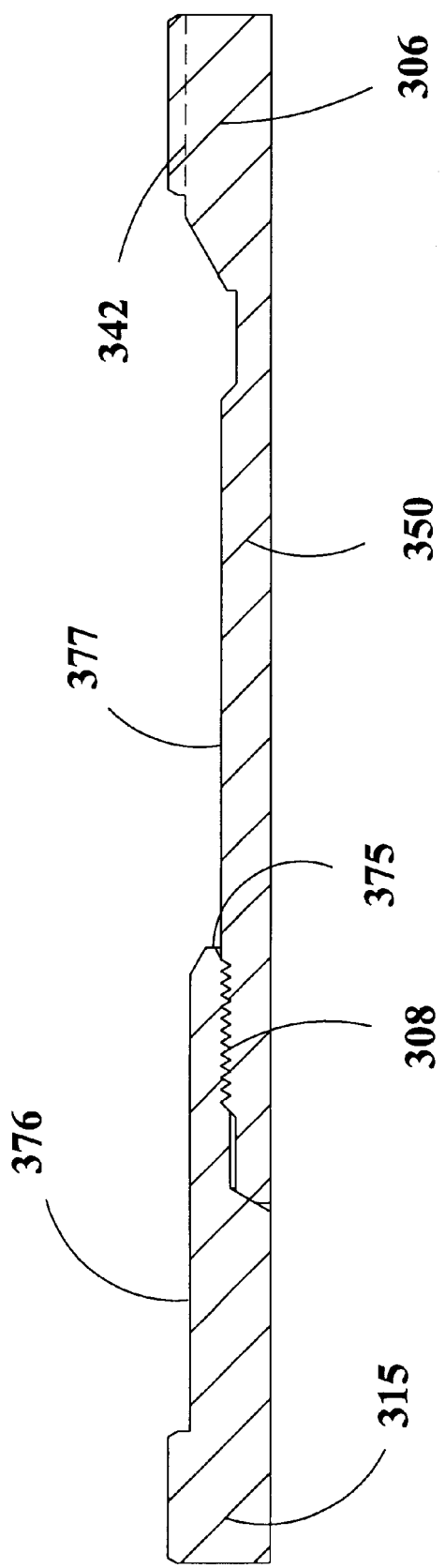
FIG. 6 is a quarter sectional view of the relief valve together with the relief valve extension.

Seal 357 resides in a second circumferential groove 358 in the principal valve extension. Referring to FIG. 3, pressure is applied to the seal 357/circumferential groove 358 along the interface between the relief valve 350 and its extension 315 and the principal valve 307 and its extension 309. If the high pressure in the adaptor leaks by seal 351 or if it leaks past the seal formed by surface 323 and seat 322 (see FIG. 4), then the annulus 312 is pressurized resulting in a leftward force on the relief valve 350 and the relief valve extension 315. Reference numeral 375 represents generally the surface upon which pressure in the annulus 312 would act when the coupling half 300 is disconnected. In the instant invention this surface is relatively small as compared to the related art and, as such, the relief valve 350 is not stripped or pulled through the principal valve. In particular, the surface 375 is a shoulder whose diameter is not more than 1.7 times the minimum diameter of the relief valve. FIG. 6 is a quarter sectional view of the relief valve together with the relief valve extension and the ratio of the diameter of the surface 376 to the surface 377 is 1.7 to 1. Reference numeral 377 is the minimum diameter of the relief valve and reference numeral 376 represents the upper limit of surface 375.

Seal 357 prevents intrusion of hydraulic fluid into the dry volume 345 generally bounded by the interior of the flush face sliding sleeve valve 302, and the exteriors of the relief valve 350/315 and principal valve 307/309. Volume 345 is maintained dry by the seals 354 and 357 which reside in circumferential grooves in the principal valve 307/309. As the flush face sliding sleeve valve 302 moves rightwardly during coupling, it does so against the force of spring 304 and the minimal force required to pressurize any air entrapped in dry volume 345. When the flush face sliding sleeve valve 302 unseats from the body 301 it travels toward the relief valve 350 and engages the relief valve 350 against the force of spring 314 unseating the relief valve from the principal valve 307 permitting flow by the relief valve and enabling the principal valve to unseat from the body 301/305. The relief valve 350 and the principal valve 307 define an annulus 312 therebetween. The principal valve includes a passageway 311 for relieving pressure by the principal valve. As the relief valve 350 unseats from the principal valve 307, flow is permitted to the annulus 312 defined by the relief valve 350 and the principal valve 307 and through the passageway 311 in the principal valve 307 and to a reservoir 352 generally defined by the principal valve 307 and the body 301. This causes a reduction in pressure upstream (i.e., rightwardly) of the principal valve 307 which enables the principal valve 307 to unseat from the body 301.

Although this invention has been described in its preferred form, it is understood that the present disclosure of the preferred form has been made only by way of example and that numerous changes in the details of construction and the combination and arrangement of parts may be resorted to without departing from the spirit and the scope of the invention as hereinafter claimed.

I claim:
1. A coupling half comprising:
   a body;
   a principal valve seating against said body and unseating therefrom;
   a substantially cylindrical relief valve seating against said principal valve and unseating therefrom;
   a flush face sliding sleeve valve seating against said body and unseating therefrom; and,
   when said flush face sliding sleeve valve unseats from said body it engages said relief valve unseating said relief valve from said principal valve permitting flow by said relief valve and enabling said principal valve to unseat from said body.
2. A coupling as claimed in claim 1 wherein said substantially cylindrical relief valve includes a shoulder thereon having a diameter not more than 1.7 times the diameter of said relief valve at its minimum diameter.
3. A coupling half as claimed in claim 2 wherein said principal valve includes a passageway for relieving pressure around said principal valve.
4. A coupling half as claimed in claim 3 wherein said relief valve and said principal valve forms an annulus.
5. A coupling half as claimed in claim 1 wherein said flush face sliding sleeve valve includes an interior and wherein said relief and principal valves include exteriors and further comprising a first balanced seal residing in a circumferential groove in said body of said coupling half and preventing the escape of fluid from said coupling half and a second balanced seal residing in a first circumferential groove of said principal valve and preventing intrusion of fluid into a volume generally bounded by said interior of the flush face sliding sleeve valve and said exteriors of the relief and principal valves.
6. A coupling half as claimed in claim 5 wherein an annulus is formed between said principal valve and said body.
7. A coupling half as claimed in claim 6 further comprising a yoke and a first spring, said first spring operable between said body and said yoke urging said yoke into engagement with said flush face sliding sleeve valve.

8. A coupling half as claimed in claim 5 further comprising a seal residing in a second circumferential groove of said principal valve and preventing intrusion of fluid into a volume generally bounded by said interior of the flush face sliding sleeve valve and the exteriors of said relief and principal valves.

9. A coupling half as claimed in claim 5 further comprising a second spring, said second spring operable between a shoulder on said relief valve and said principal valve.

10. A coupling half as claimed in claim 9 wherein said coupling half is a male coupling half.

11. A coupling half as claimed in claim 5 wherein said coupling half is a male coupling half.

12. A coupling half as claimed in claim 10 in combination with a female half.

13. A coupling half as claimed in claim 11 in combination with a female half.

14. A coupling half comprising:

a body;

a principal valve seating against said body and unseating therefrom;

a substantially cylindrical relief valve seating against said principal valve and unseating therefrom;

said relief valve having an exterior;

said exterior of said relief valve guiding said principal valve as said principal valve seats and unseats against said body;

a flush face sliding sleeve valve seating against said body and unseating therefrom;

and, when said flush face sliding sleeve valve unseats from said body it engages said relief valve unseating said relief valve from said principal valve permitting flow by said relief valve and enabling said principal valve to unseat from said body.

15. A coupling half as claimed in claim 14 wherein said substantially cylindrical relief valve includes a shoulder thereon having a diameter not more than 1.7 times the diameter of said relief valve at its minimum diameter.

* * * * *